United States Patent
Sun (10) Patent No.: US 7,466,643 B2
(45) Date of Patent: Dec. 16, 2008

(54) OPTICAL PICKUP SYSTEM AND INFORMATION RECORDING AND/OR REPRODUCING APPARATUS EMPLOYING THE SAME

(75) Inventor: Wen-Hsin Sun, Tucheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 649 days.

(21) Appl. No.: 11/145,108

(22) Filed: Jun. 3, 2005

(65) Prior Publication Data
US 2006/0007810 A1    Jan. 12, 2006

(30) Foreign Application Priority Data
Jul. 9, 2004    (TW) ............... 93120635 A (51) Int. Cl.
*G11B 7/00* (2006.01)
(52) U.S. Cl. .................. 369/112.28; 369/112.21
(58) Field of Classification Search .......... 369/112.28, 369/112.21, 112.14, 112.09, 112.02
See application file for complete search history.

(56) References Cited

U.S. PATENT DOCUMENTS

| 5,189,655 | A  | 2/1993  | Ogata et al. |
|---|---|---|---|
| 6,324,150 | B1 | 11/2001 | Ju |
| 6,442,124 | B1 | 8/2002  | Chung et al. |
| 6,654,336 | B2 | 11/2003 | Kadowaki et al. |
| 6,747,939 | B2 | 6/2004  | Saitoh et al. |
| 2003/0090988 | A1* | 5/2003 | Sun et al. ............... 369/112.28 |
| 2003/0185136 | A1 | 10/2003 | Kaiho et al. |
| 2003/0235137 | A1 | 12/2003 | Nishioka et al. |

* cited by examiner

*Primary Examiner*—Jorge L Ortiz Criado
(74) *Attorney, Agent, or Firm*—Morris, Manning & Martin LLP; Tim Tingkang Xia (57) ABSTRACT

An optical pickup system includes a first light source emitting first light beams with a first wavelength, a second light source emits second light beams with a second wavelength greater than the first wavelength, a third light source emits third light beams with a third wavelength greater than the second wavelength, a composite prism comprising a first prism facing the first and second light sources, a second prism facing the third light source, and a third prism for receiving the first, second and third light beams from the first and second prisms, the first prism has a surface facing the first and second light sources, the surface defines first and second regions, the second region has an aspherical surface to compensate aberration of the second light beams, a collimating lens and objective lens disposed in a common optical path for transmitting the three light beams from the composite prism.

20 Claims, 7 Drawing Sheets

OPTICAL PICKUP SYSTEM AND INFORMATION RECORDING AND/OR REPRODUCING APPARATUS EMPLOYING THE SAME

BACKGROUND OF THE INVENTION

1. Field of the Invention

The present invention relates to an optical pickup system used in an information recording and/or reproducing apparatus, and more particularly to an optical pickup system for accessing different types of optical recording media and an information recording and/or reproducing apparatus employing the same.

2. Prior Art

In recent years, in order to satisfy ongoing requirements for recording and/or reproducing large quantities of data on recording media, many manufacturers have sought to increase the recording density of recording media. The recording density of a recording medium is determined by the size of a light spot illuminating the medium. Generally, the size of the light spot is proportional to the wavelength of the light, and inversely proportional to the numerical aperture (NA) of an objective lens that focuses the light. Therefore, reducing the wavelength or increasing the NA can increase the recording density of the recording medium.

An industry-wide standard relating to a next generation optical disk such as a high definition-digital versatile disk (HD-DVD) has been proposed to satisfy the demand for increased recording density of recording media. The HD-DVD standard employs a laser diode generating a blue laser with a wavelength of 405 nm, an objective lens having an NA of 0.85, and a light transmission protective layer of the optical disk having a thickness of 0.1 mm.

It is important to be able to employ a conventional compact disk (CD) and a conventional digital versatile disk (DVD) in an HD-DVD apparatus, because CDs and DVDs are still very popular whereas HD-DVDs are still relatively nascent. However, various optical conditions for recording/reproducing on/from CDs, DVDs, and HD-DVDs are different from each other, as shown in table 1.

TABLE 1

|  | CD | DVD | HD-DVD |
| --- | --- | --- | --- |
| wavelength | 780 nm | 650 nm | 405 nm |
| numerical aperture (NA) | 0.45 | 0.6 | 0.85 |
| recording capacity | 0.65 GB | 4.7 GB | more than 20 GB |
| thickness of protective layer | 1.2 mm | 0.6 mm | 0.1 mm |

As can be seen, different optical disks need different objective lenses with different NAs. Therefore in a single conventional HD-DVD apparatus, there are usually three different objective lenses respectively adapted to CDs, DVDs and HD-DVDs. However, this makes the volume of the HD-DVD apparatus unduly large. To avoid this shortcoming, another conventional HD-DVD apparatus with only one objective lens and a wavelength selector has been developed. The wavelength selector changes an effective diameter of the objective lens by means of limiting the luminous flux propagating to the objective lens. With the help of the wavelength selector, the objective lens in the HD-DVD apparatus is suitable for reading and/or reproducing not only with respect to HD-DVDs, but also with respect to DVDs and CDs.

An information recording and/or reproducing apparatus employing only one objective lens for accessing three different optical recording media is disclosed in US patent application publication no. 2003/0185136A1. This publication discloses an information recording and/or reproducing apparatus including three laser diodes, three photodiodes, three beam splitters, three condensing lenses, a wavelength-selecting unit, and an objective lens. The three diodes emit three laser beams with different wavelengths, e.g., 405 nm, 650 nm and 780 nm, to be used in recording and reproducing operations for HD-DVDs, DVDs and CDs respectively. The three photodiodes receive the three laser beams reflected from the three different optical disks respectively. The three condensing lenses respectively condense the three laser beams. The wavelength-selecting unit changes the luminous flux of laser beams propagating to the objective lens. The objective lens focuses the three laser beams on the three different optical disks. In this apparatus, the wavelength-selecting unit and the objective lens are in a common optical path for the three laser beams to propagate along. The size of the information recording and/or reproducing apparatus is reduced to a certain extent, because two objective lenses adapted to DVDs and CDs are not required and are omitted. The wavelength-selecting unit changes the effective diameter of the objective lens by means of limiting the luminous flux propagating to the objective lens. Therefore the objective lens can be used in recording and/or reproducing operations for the three different optical disks, with optical aberration being reduced to a certain extent.

However, the structure and the size of the information recording and/or reproducing apparatus are relatively complex and large, because numerous optical components are still required.

SUMMARY OF THE INVENTION

Accordingly, an object of the present invention is to provide an optical pickup system for accessing a plurality of different optical recording media, the optical pickup system being compact.

Another object of the present invention is to provide an optical pickup apparatus using the optical pickup system described above.

To achieve the first object, an optical pickup system for accessing three different optical recording media in accordance with the present invention is provided. The optical pickup system includes a first light source, a second light source, a third light source, a composite prism, a collimating lens and an objective lens. The first light source emits first light beams with a first wavelength. The second light source emits second light beams with a second wavelength greater than the first wavelength. The third light source emits third light beams with a third wavelength greater than the second wavelength. The composite prism comprises a first prism facing the first and second light sources, a second prism facing the third light source, and a third prism for receiving the first, second and third light beams from the first and second prisms, the first prism has a surface facing the first and second light sources, the surface defines first and second regions, the second region having an aspherical surface to compensate aberration of the second light beams. The collimating lens is disposed in a common optical path for collimating and transmitting the first, second and third light beams from the composite prism. The objective lens is disposed in a common optical path for focusing the first, second and third light beams from the wavelength selector on three different optical recording media.

To achieve the second object, an information recording and/or reproducing apparatus employing the optical pickup system for accessing three different optical recording media includes an optical pickup system described above is provided. The information recording and/or reproducing apparatus further includes a drive mechanism for changing a relative position between any one of the three optical recording media and the optical pickup system; and an electrical signal processor for receiving signals output from the optical pickup system and performing calculations on the signals to obtain desired information.

Other objects, advantages and novel features will be drawn from the following detailed description of preferred embodiments with the attached drawings, in which:

DETAILED DESCRIPTION OF THE INVENTION

Figure 1:
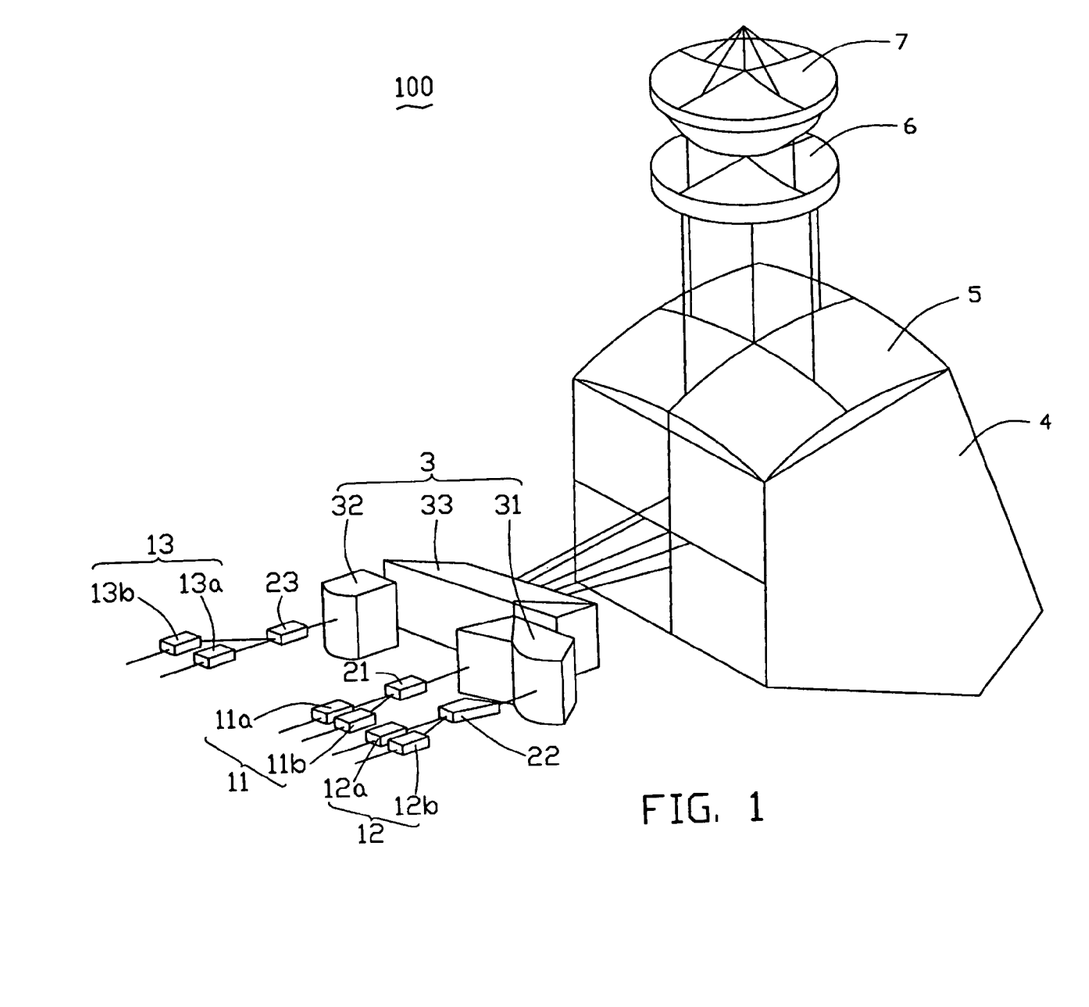
FIG. 1 is a schematic, isometric view of an optical pickup system according to a preferred embodiment of the present invention, showing optical paths thereof.
Figure 2:
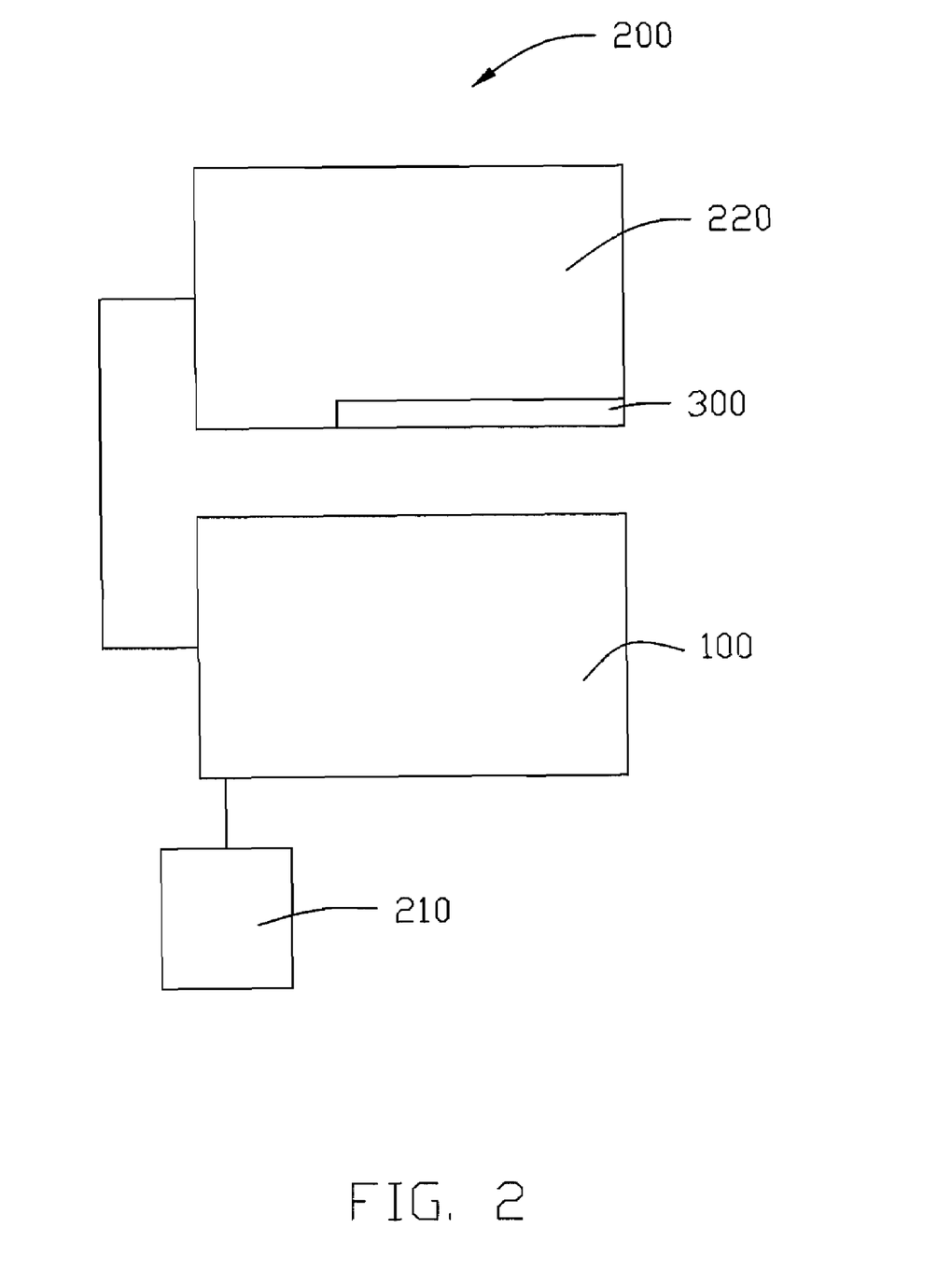
FIG. 2 is a schematic diagram of an information recording and/or reproducing apparatus including the optical pickup system of FIG. 1, together with an optical recording media.

Referring to FIG. 1, an optical pickup system 100 according to a preferred embodiment of the present invention is illustrated. Referring also to FIG. 2, the optical pickup system 100 is used in an information recording and/or reproducing apparatus 200 for accessing a plurality of different optical recording media. In FIG. 2, one suck optical recording media 300 is shown. The optical recording media 300 may, for example, be an HD-DVD, a DVD or a CD. The optical pickup system 100 includes first, second and third semiconductor modules 11, 12, 13, first, second and third diffraction elements 21, 22, 23, a composite prism 3, a reflective prism 4, a collimating lens 5, a wavelength selector 6, and an objective lens 7. The composite prism 3, the reflective prism 4, the collimating lens 5, the wavelength selector 6 and the objective lens 7 are located in a common optical path (not labeled).

The first, second and third semiconductor modules 11, 12, 13 are positioned side by side and arranged on a same side of the composite prism 3. The first semiconductor module 11 includes a first light source 11a and a first detector 11b. The first light source 11a emits first light beams having a first wavelength of 405 nm, which is suitable for a first optical disk (not shown) such as an HD-DVD. The first detector 11b is used to receive the first light beams reflected from the first optical disk. The second semiconductor module 12 includes a second light source 12a and a second detector 12b. The second light source 12a emits second light beams having a second wavelength of 650 nm, which is suitable for a second optical disk (not shown) such as a DVD. The second detector 12b is used to receive the second light beams reflected from the second optical disk. The third semiconductor module 13 includes a third light source 13a and a third detector 13b. The third light source 13a emits third light beams having a third wavelength of about 780 nm, which is suitable for a third optical disk (not shown) such as a CD. The third detector 13b is used to receive the third light beams reflected from the third optical disk.

The first, second, and third diffraction elements 21, 22, 23 are located respectively between the first, second, third semiconductor modules 11, 12, 13 and the composite prism 3 (described as below) and are opposite to the first, second and third light sources 11a, 12a, 13a respectively.

Figure 3:
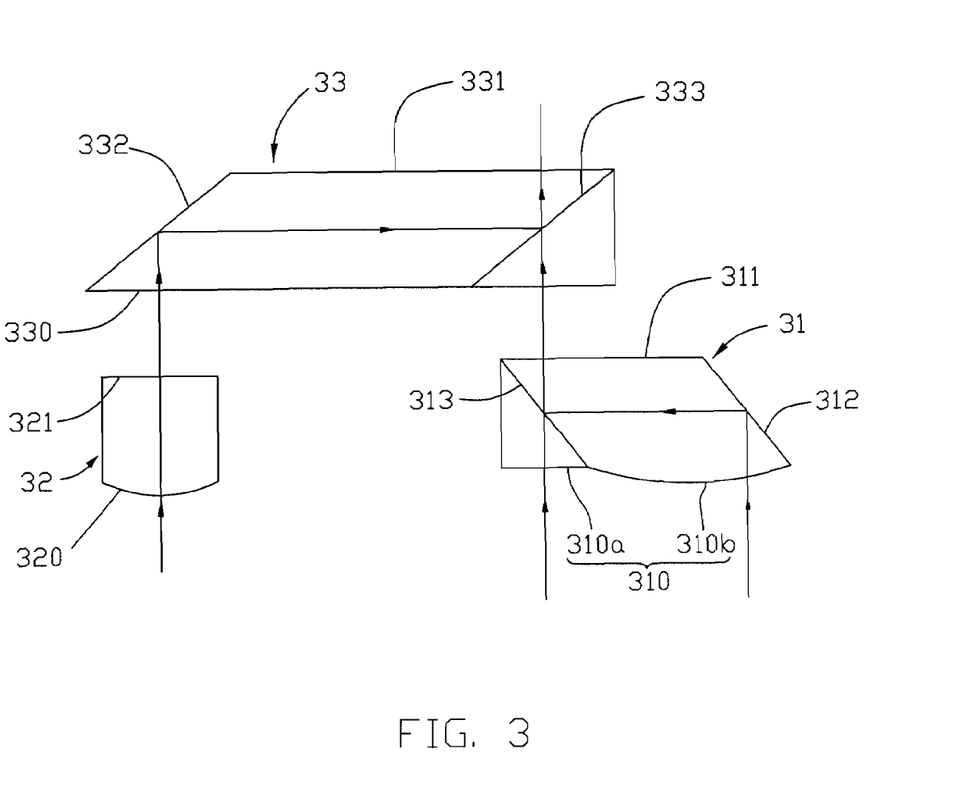
FIG. 3 is an enlarged, schematic top view of a composite prism of the optical pickup system of FIG. 1, showing optical paths thereof.

Referring also to FIG. 3, the composite prism 3 includes first, second and third prisms 31, 32, 33. The first and second prisms 31, 32 are located on a same side of the third prism 33. The first prism 31 has three first surfaces labeled 310, 311, 312, and a first interface 313. An angle between the first surfaces 310 and 312 is approximately 45°. The first interface 313 is parallel to the first surface 312. The first interface 313 has a function of selectively reflecting light beams or permitting light beams to pass therethrough, according to the different wavelengths of the light beams. The first surface 310 is divided into first and second regions 310a and 310b. The second region 310b includes an aspherical surface, which has functions of compensating optical aberration of and collimating the second light beams emitted from the second light source 12a. The second prism 32 has two second surfaces 320, 321. The second surface 320 includes an aspherical surface, which has functions of compensating optical aberration of and collimating the third light beams emitted from the third light source 13a. The third prism 33 includes three third surfaces 330, 331, 332, and a second interface 333. The second interface 333 is parallel to the third surface 332. The second interface 333 has a function of selectively reflecting light beams or permitting light beams to pass therethrough, according to the different wavelengths of the light beams.

Figure 4:
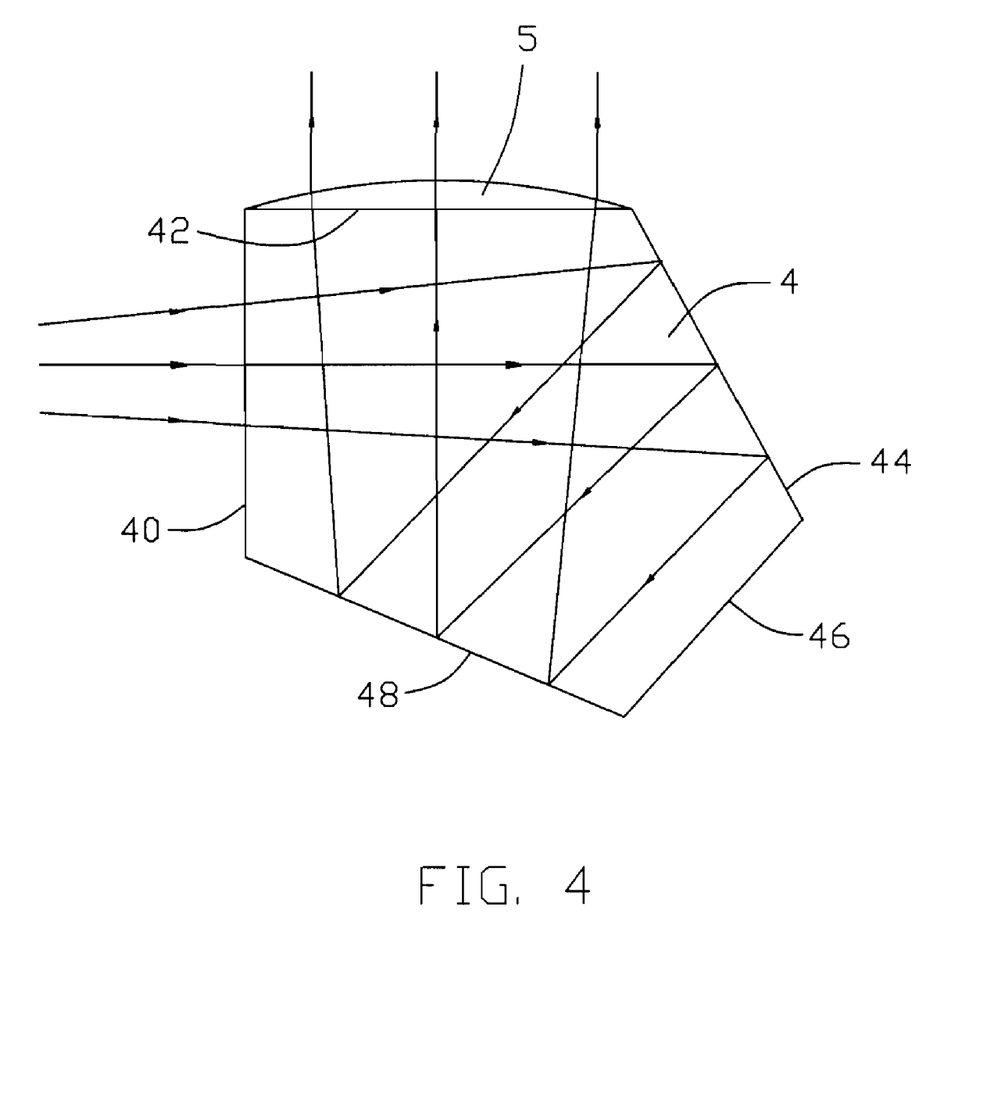
FIG. 4 is a schematic, side view of a reflective prism and a collimating lens of the optical pickup system of FIG. 1, showing optical paths thereof.

Referring also to FIG. 4, the reflective prism 4 is a penta prism, which includes five fourth surfaces 40, 42, 44, 46, 48. The fourth surface 40 is perpendicular to the fourth surface 42. An angle between respective adjacent fourth surfaces 42 and 44, 44 and 46, 46 and 48, and 48 and 40 is 112.5° in each case. In addition, the fourth surfaces 44 and 48 have reflective films thereon. Light is internally reflected by the fourth surfaces 44 and 48, and then propagates out from the fourth surface 42 into the collimating lens 5. The net effect is that incoming light entering the fourth surface 40 is deviated 90° by the reflective prism 4. The collimating lens 5 may be directly attached to the fourth surface 42 of the reflective prism 4, as illustrated. Alternatively, the collimating lens 5 may be spaced from the fourth surface 42.

Figure 5:
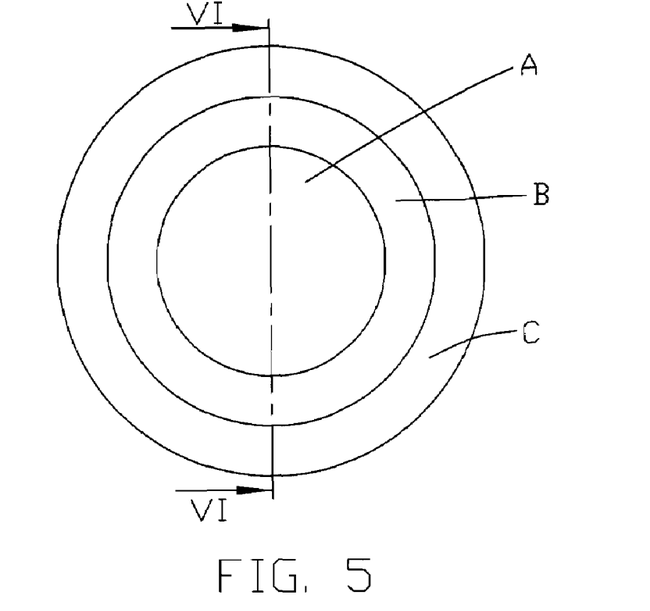
FIG. 5 is an enlarged, schematic top view of a wavelength selector of the optical pickup system of FIG. 1.
Figure 6:
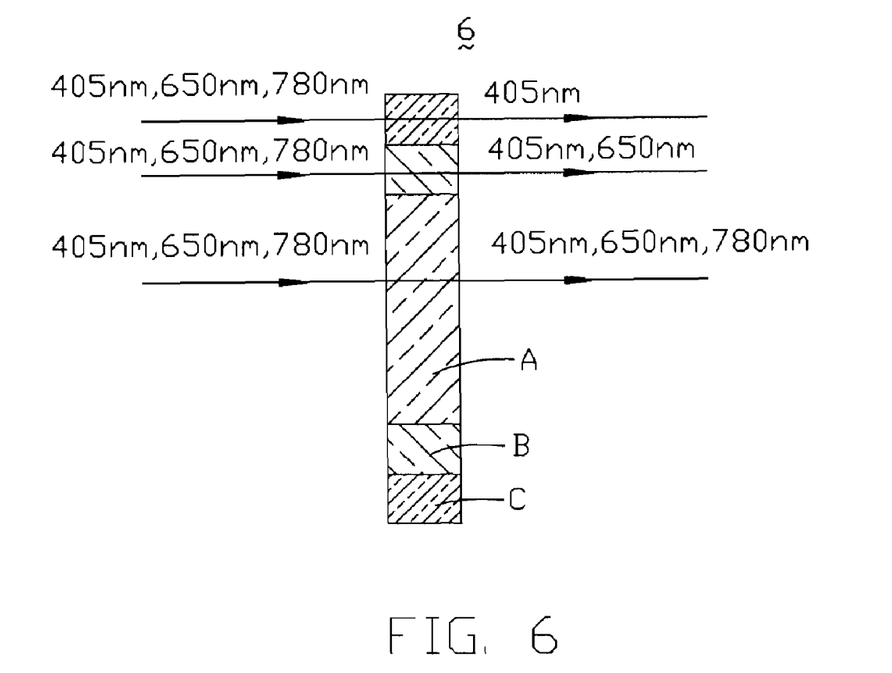
FIG. 6 is a cross-sectional view of the wavelength selector of FIG. 5 taken along line VI-VI thereof, showing optical paths thereof.

Referring also to FIGS. 5 and 6, the wavelength selector 6 is located between the collimating lens 5 and the objective lens 7. The wavelength selector 6 has three concentric portions A, B, C, in that order from a center to a periphery of the wavelength selector 6. The portion A permits light beams of all wavelengths, such as the first, second and third light beams, to propagate therethrough. The portion B only permits light beams with short and intermediate wavelengths, such as the first and second light beams, to propagate therethrough. The portion C only permits light beams with short wavelengths, such as the first light beams, to propagate therethrough.

In the present embodiment, both the collimating lens 5 and the objective lens 7 have optical parameters corresponding to the first wavelength for the first optical disk such as the HD-DVD.

When recording information on and/or reproducing information from the first optical disk, the first light beams with the first wavelength of 405 nm emitted by the first light source 11*a* propagate through the first diffraction element 21, are incident on the first region 310*a*, and then pass through the first interface 313 and the first surface 311 of the first prism 31 in sequence. The first light beams propagate to the third surface 330 of the third prism 33, and propagate through the second interface 333 and the third surface 331 in turn. Then the first light beams are incident on the fourth surface 40 of the reflective prism 4, are reflected by the fourth surfaces 44, 48, and then propagate to the collimating lens 5. The collimating lens 5 collimates the first light beams into parallel light beams, and directs the first light beams toward the first optical disk. After propagating through the collimating lens 5, the first light beams are incident on the wavelength selector 6. The wavelength selector 6 does not block any of the first light beams, so that the first light beams completely propagate through the wavelength selector 6 and are incident on the objective lens 7. The first light beams are converged to a light spot (not labeled) on the first optical disk by the objective lens 7. The first optical disk reflects the first light beams, and the first light beams follow the foregoing optical path. Eventually, the first light beams are refracted by the first diffraction element 21 to the first detector 11*b*. The first detector 11*b* converts the first light beams to electrical signals. After this, an electrical signal processor 210 of the information recording and/or reproducing apparatus 200 receives electrical signals and obtains desired information. Furthermore, a drive mechanism 220 of the information recording and/or reproducing apparatus 200 changes a relative position between the first optical disk and the optical pickup system 100, also based on electrical signals output from the optical pickup system 100.

In the above-described first optical path from the first light source 11*a* to the objective lens 7, parameters of all the components are in accord with the first optical disk. The objective lens 7 matches the parameters of the first optical disk, such as the wavelength, the numerical aperture and the thickness of the protective layer of the first optical disk. Therefore, the objective lens 7 helps prevent optical aberration from occurring in the optical pickup system 100. Because the first light beams undergo two reflections in the reflective prism 4, the optical length of the optical pickup system 100 is shortened. Therefore the size of the optical pickup system 100 is compact.

When recording information on and/or reproducing information from the second optical disk, the second light beams with the second wavelength of 650 nm emitted by the second light source 12*a* propagate through the second diffraction element 22, are incident on the second region 310*b*, and then propagate to the first surface 312, the first interface 313 and the first surface 311 of the first prism 31 in sequence. The second region 310*b* condenses the second light beams and compensates optical aberration. The second light beams propagate to the third surface 330 of the third prism 33, and pass through the second interface 333 and third surface 331 in sequence. Then the second light beams propagate to the fourth surface 40 of the reflective prism 4, are reflected by the fourth surfaces 44, 48, and propagate to the collimating lens 5. The collimating lens 5 collimates the second light beams into parallel light beams, and directs the second light beams toward the second optical disk. The second light beams are then incident on the wavelength selector 6. The portions A, B of the wavelength selector 6 do not block the second light beams, but the portion C does. Accordingly, the second light beams can partially propagate through the wavelength selector 6. The second light beams are converged to a light spot (not labeled) on the second optical disk by the objective lens 7. The second optical disk reflects the second light beams, and the second light beams follow the foregoing optical path. Eventually, the second light beams are refracted by the second diffraction element 22 to the second detector 12*b*. The second detector 12*b* converts the second light beams to electrical signals. After this, the electrical signal processor 210 of the information recording and/or reproducing apparatus 200 receives electrical signals and obtains desired information. Furthermore, the drive mechanism 220 of the information recording and/or reproducing apparatus 200 changes a relative position between the second optical disk and the optical pickup system 100, also based on electrical signals output from the optical pickup system 100.

In the above-described second optical path from the second light source 12*a* to the objective lens 7, optical aberration is significantly corrected because the second region 310*b* of the second prism 32 has an aspherical surface. The size of the optical system 100 is compact because: (i) the optical length is shortened because the second light beams undergo two reflections in each of the first prism 31 and the reflective prism 4, and (ii) the optical components such as the composite prism 3, the reflective prism 4, the collimating lens 5, the wavelength selector 6 and the objective lens 7 are shared with the first light beams used to access the first optical disk.

When recording information on and/or reproducing information from the third optical disk, the third light beams with the third wavelength of 780 nm emitted by the third light source 13*a* propagate through the third diffraction element 23, are incident on the second surface 320 of the second prism 32, and then exit from the second surface 321. The second surface 320 condenses the third light beams and compensates optical aberration. Then the third light beams are incident on the third prism 33, and propagate from the third surface 332, the second interface 333, and through the third surface 331 in sequence. Then the second light beams are incident on the fourth surface 40 of the reflective prism 4, are reflected by the fourth surfaces 44, 48, and propagate to the collimating lens 5. The collimating lens 5 collimates the third light beams into parallel light beams, and directs the third light beams toward the third optical disk. The third light beams are then incident on the wavelength selector 6. The portion A of the wavelength selector 6 does not block the third light beams, but the portions B, C do. Accordingly, the third light beams can partially propagate through the wavelength selector 6. The third light beams are converged to a light spot (not labeled) on the third optical disk by the objective lens 7. The third optical disk reflects the third light beams, and the third light beams follow the foregoing optical path. Eventually, the third light beams are refracted by the third diffraction element 23 to the third detector 13*b*. The third detector 13*b* converts the third light beams to electrical signals. After this, the electrical signal processor 210 of the information recording and/or reproducing apparatus 200 receives electrical signals and obtains desired information. Furthermore, the drive mechanism 220 of the information recording and/or reproducing apparatus 200 changes a relative position between the third optical disk and the optical pickup system 100, also based on electrical signals output from the optical pickup system 100.

In the above-described third optical path from the third light source 13*a* to the objective lens 7, optical aberration is significantly corrected, because the surface 320 of the second prism 32 is an aspherical surface. The size of the optical pickup system 100 is compact because: (i) the third light beams undergo two reflections in each of the third prism 33 and the reflective prism 4, and (ii) the optical components such as the composite prism 3, the reflective prism 4, the collimating lens 5, the wavelength selector 6 and the objective lens 7 are shared with the first and second light beams which are used to access the first and second optical disks.

Figure 7:
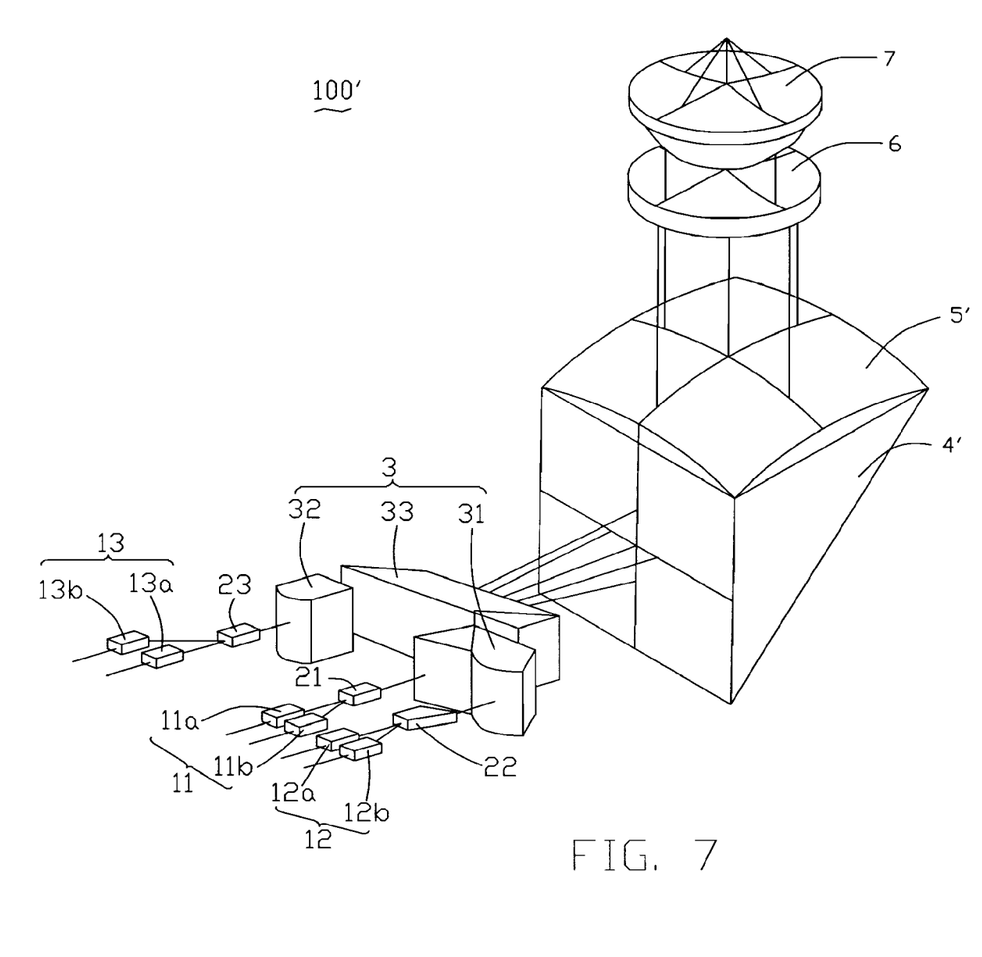
FIG. 7 is a schematic, isometric view of an optical pickup system according to a second embodiment of the present invention, showing optical paths thereof.
Figure 8:
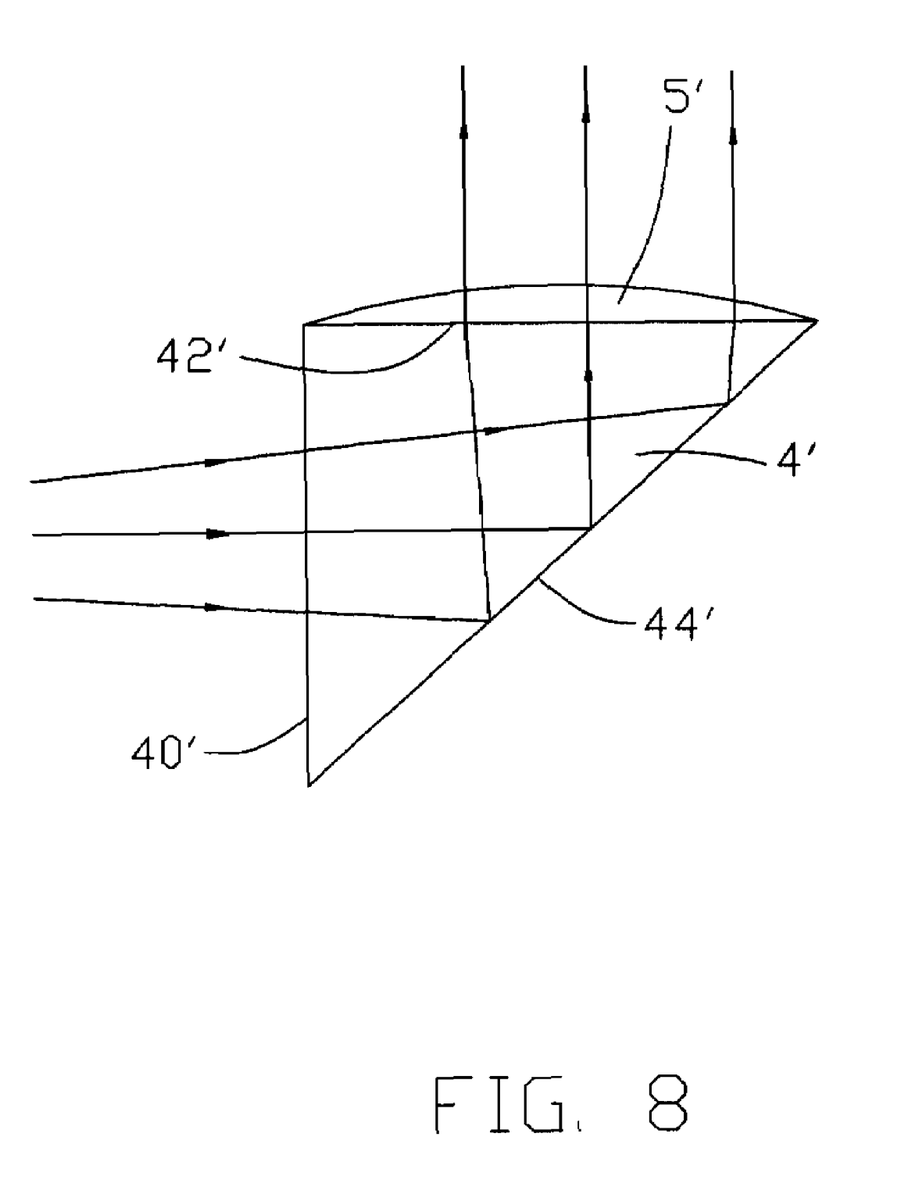
FIG. 8 is a side view of a reflective prism and a collimating lens of the optical pickup system of FIG. 7, showing optical paths thereof.

Referring to FIGS. 7 and 8, an optical pickup system 100' according to a second embodiment of the present invention is illustrated. The only difference between the optical pickup system 100' and the optical pickup system 100 of the first embodiment is that the optical pickup system 100' has a reflective prism 4' instead of the reflective prism 4. The reflective prism 4' is a triangular prism which has three fourth surfaces 40', 42', 44'. Accordingly, the first, second and third light beams are reflected once in the reflective prism 4'.

Although the present invention has been described with reference to specific embodiments, it should be noted that the described embodiments are not necessarily exclusive, and that various changes and modifications may be made to the described embodiments without departing from the scope of the invention as defined by the appended claims.

I claim:

1. An optical pickup system for accessing three different types of optical recording media, comprising:
   a first light source emitting first light beams with a first wavelength;
   a second light source emitting second light beams with a second wavelength greater than the first wavelength;
   a third light source emitting third light beams with a third wavelength greater than the second wavelength;
   a composite prism comprising a first prism facing the first and second light sources, a second prism facing the third light source, and a third prism for receiving the first, second and third light beams from the first and second prisms, wherein the first prism has a surface facing the first and second light sources, the surface defines first and second regions, and the second region has an aspherical surface to compensate aberration of the second light beams;
   a collimating lens disposed in a common optical path for collimating and transmitting the first, second and third light beams from the composite prism; and
   an objective lens disposed in a common optical path for focusing the first, second and third light beams from the wavelength selector on the three different types of optical recording media.

2. The optical pickup system as described in claim 1, wherein the first and second prisms are positioned side by side and disposed on a same side of the third prism.

3. The optical pickup system as described in claim 2, wherein the first prism transmits the first light beams directly therethrough, and reflects the second light beams twice.

4. The optical pickup system as described in claim 3, wherein the first prism has a first interface with a function of selectively permitting the first light beams to pass therethrough and the second light beams to reflect therefrom.

5. The optical pickup system as described in claim 3, wherein the second prism compensates aberration of the third light beams, and transmits the third light beams to the third prism.

6. The optical pickup system as described in claim 5, wherein the second prism has an aspherical surface.

7. The optical pickup system as described in claim 5, wherein the third prism transmits the first and second light beams directly therethrough, and reflects the third light beams twice.

8. The optical pickup system as described in claim 5, wherein the third prism has an interface with a function of selectively permitting the first and second light beams to pass therethrough and the third light beams to reflect therefrom.

9. The optical pickup system as described in claim 1, further comprising a wavelength selector disposed between the collimating lens and the objective lens.

10. The optical pickup system as described in claim 9, wherein the wavelength selector does not block any of the first light beams, and blocks part of each of the second and third light beams.

11. The optical pickup system as described in claim 1, further comprising a reflective prism disposed between the composite prism and the collimating lens.

12. The optical pickup system as described in claim 11, wherein the reflective prism is attached to the collimating lens.

13. The optical pickup system as described in claim 11, wherein the reflective prism is a penta prism and reflects the first, second and third light beams twice.

14. The optical pickup system as described in claim 11, wherein the reflective prism is a triangular prism and reflects the first, second and third light beams once.

15. The optical pickup system as described in claim 1, further comprising three diffraction elements facing the first, second and third light sources respectively, for diffracting first, second and third light beams returned from the three different types of optical recording media.

16. The optical pickup system as described in claim 15, further comprising three detectors adjacent to the three light sources respectively, for receiving the diffracted first, second and third light beams.

17. An apparatus for accessing three different types of optical recording media, comprising:
   an optical pickup system comprising:
      a first light source emitting first light beams with a first wavelength;
      a second light source emitting second light beams with a second wavelength greater than the first wavelength;
      a third light source emitting third light beams with a third wavelength greater than the second wavelength;
      a composite prism comprising a first prism facing the first and second light sources,
      a second prism facing the third light source, and a third prism for receiving the first, second and third light beams from the first and second prisms, wherein the first prism has a surface facing the first and second light sources, the surface defines first and second regions, and the second region has an aspherical surface to compensate aberration of the second light beams;
      a collimating lens disposed in a common optical path for collimating and transmitting the first, second and third light beams from the composite prism; and an objective lens also disposed in a common optical path for focusing the first, second and third light beams from the wavelength selector on the three different types of optical recording media; and
   a drive mechanism for changing a relative position between any one of the first, second and third optical recording media and the optical pickup system; and
   an electrical signal processor for receiving signals output from the optical pickup system and performing calculations on the signals to obtain desired information.

18. The apparatus as described in claim 17, further comprising a reflective prism disposed between the composite prism and the collimating lens.

19. An apparatus for accessing multiple different optical recording media, said apparatus having an optical pickup system to obtain information from a selective one of said multiple different optical recording media, said optical pickup system further comprising:
- a first light source emitting first light beams with a first wavelength;
- a second light source emitting second light beams with a second wavelength greater than said first wavelength;
- a third light source emitting third light beams with a third wavelength greater than said second wavelength;
- a composite prism facing said first, second and third light sources for receiving said first, second and third light beams therefrom respectively, said composite prism defining at least two aspheric surfaces used for passage of said second and third light beams respectively and exclusively; and
- an objective lens disposed next to said selective one of said multiple different optical recording media for receiving a corresponding one of said first, second and third light beams to said selective one of said multiple different optical recording media from said composite prism and transmitting said corresponding one of said first, second and third light beams to said selective one of said multiple different optical recording media.

20. The apparatus as described in claim 19, further comprising a reflective prism disposed between said composite prism and said objective lens for passage of said first, second and third light beams.

* * * * *